United States Patent [19]

Gorgone et al.

[11] 4,127,328

[45] Nov. 28, 1978

[54] APPARATUS FOR CONDUCTING SECONDARY TESTS FOR SECURITY VALIDATION

[75] Inventors: Robert L. Gorgone, Mentor; Gerald Iannadrea, Painesville; Alan J. Kovach, Cleveland, all of Ohio

[73] Assignee: Ardac, Inc., Willoughby, Ohio

[21] Appl. No.: 740,385

[22] Filed: Nov. 10, 1976

[51] Int. Cl.[2] ........................ G06K 9/02; G01N 21/32

[52] U.S. Cl. ........................................ 356/71; 250/239; 356/244

[58] Field of Search ............ 356/71, 73, 212, 204–206, 356/244; 250/239, 556; 340/146.3 F

[56] References Cited

U.S. PATENT DOCUMENTS

| | | | |
|---|---|---|---|
| 2,941,187 | 6/1960 | Simjian | 356/71 |
| 3,457,421 | 7/1969 | Bayha | 250/556 |
| 3,536,927 | 10/1970 | Mink | 250/556 |
| 3,679,314 | 7/1972 | Mustert | 356/71 |

*Primary Examiner*—John K. Corbin
*Assistant Examiner*—Wm. H. Punter
*Attorney, Agent, or Firm*—Oldham, Oldham, Hudak & Weber Co.

[57] A

Apparatus for conduc validation are present invention a light source, either infrared or visible, is cast upon two neighboring areas of a paper purported to be a valid instrument, these areas being of different light reflective characteristics. Photo cells are maintained in close juxtaposition to each of these two areas and the light reflected therefrom or passed therethrough is sensed by the photo cells. Comparator circuits are interconnected with the photo cells and, in part, determine the validity of the instrument on the basis of the comparison of the intensity of light reflected by each of the two areas. In another embodiment of the invention, a reference reflective surface is provided in juxtaposition to one of the photo cells to test those instruments not having neighboring areas of different light reflective characteristics. In yet another embodiment of the invention, a reference photo cell is provided for sensing the light actually emitted from the light source and establishing this light emission level as a reference level. Further, dividers and comparator circuits interconnect this reference photo cell with one of the other two photo cells for further determining the instrument's validity by testing whether the light reflected from one of the areas falls within a predetermined percentage of the light actually emitted from the light source. The entire unit of the light source, photo cells, and reference photo cell are all maintained within a singular molded a highly light reflec- Figures

APPARATUS FOR CONDUCTING SECONDARY TESTS FOR SECURITY VALIDATION

BACKGROUND OF THE INVENTION

The disclosed invention deals in the art of security validation apparatus and particularly improvements therein. In the known art, devices exist whereby the validation of currency, securities and the like may be achieved by masking certain areas of the instrument with a reticle or other suitable element to determine the presence or absence of a particular pattern thereon. However, with increased sophistication of photocopying apparatus, high resolution copies of such instruments may be obtained which can pass these pattern matching primary tests and cause the validation apparatus to accept photocopies as true and valid instruments. Consequently, it has become desirable to develop apparatus for conducting secondary tests for security validation to detect and reject such photocopies and other facsimiles.

The so-called single-sided photocopies of a valid instrument may be readily detected by capitalizing on the discovered fact that most securities are two-sided and, on the side opposite that bearing the pattern tested with the primary test, there generally exists two areas, either adjacent or otherwise; one of a highly light reflective nature and the other of a lower light reflective nature. A ratio exists between the two. It has been demonstrated that on a given instrument the ratio of reflectances of the two areas is consistent among like instruments. This is primarily a result of the printing and process control involved in the manufacture of the instrument. Furthermore, it has been demonstrated that percent reflectance from either area with respect to an energy bandwidth is predictable within a certain tolerance. Consequently, a relationship exists between the emitted light and the reflected light from an area of an instrument. On a single-sided photocopy, such areas will obviously not be present and hence a test of the relative reflective characteristics of these areas will fail. While some instruments do not have two distinct neighboring areas, a reflectory may be used to simulate one area. This technique generally would be used against the single-sided copy but it can be extended to be used to discriminate against the bottom side of a double-sided copy.

With the advent of the production of double-sided photocopies, it has been found that the above-recited tests for relative reflective characteristics may be utilized to distinquish between the legitimate instrument and the double-sided copy. The technique may be applied to either side of the instrument. The light reflective characteristics may be tested by using an infrared light and testing a first area on the instrument which has a low reflectance as to infrared and a second area which is highly reflective with respect thereto. The tests may also operate in the visible range and test areas of the instrument of different colors, such areas being reflective as to light of the color of the area and absorptive with respect to other such light. In this type system, a bandwidth of usable light falls on the two areas. One area reflects a high percentage of the light and the other a low percentage. By relying on the fact that photocopies generally reproduce with ink or toner which is absorptive as to infrared as well as color and only in black and white (not color), this reflective ratio test may be conducted inasmuch as the relative reflective characteristics of the instrument are nonexistent in a photocopy. Further, even with a two-sided photocopy, tests may be utilized to compare the relative values of reflectance against a related reference to guarantee that not only the high to low reflection ratio exists, but also that such ratio is within a particular bandwidth, such criteria being difficult to reproduce via a photocopy.

It has also been found in security validation testing that the testing of an instrument against absolute values is not always accurate inasmuch as aging of the equipment, the gathering of dust and dirt on lenses, the shifting of filaments within lamps, and the age and condition of the instrument itself all have a bearing upon readings against absolute values. Consequently, it has been found that ratios or relative comparisons of one area of the note against another provide the most accurate means for testing validity without chancing an inordinate number of rejections of valid instruments.

OBJECTS OF THE INVENTION

In light of the foregoing, it is an object of the instant invention to present apparatus for conducting secondary tests for security validation which may readily reject a one-sided facsimile by testing for the presence or absence of light reflective or transmissive characteristics of various inks, or operate in the visible range, taking advantage of the ink colors utilized in many securites.

Yet another object of the invention is to present apparatus for conducting secondary tests for security validation wherein emission and reflection tests utilizing a ratio technique are made on dual areas of the security such that aging, wear, voltage shifts, lamp filament alterations, and even wear characteristics of the security itself do not substantially diminish the system's integrity.

Still another object of the invention is to present apparatus for conducting secondary tests for security validation wherein a reference light level is established such that tests of relative values of reflection or transmission may be compared against a reference light level.

An additional object of the invention is to present apparatus for conducting secondary tests for security validation wherein a reference reflective surface may be provided as a reference for comparison when testing those securities which are not characterized by areas of different reflective natures.

Yet a further object of the invention is to present apparatus for conducting secondary tests for security validation which is simplistic in design, reliable in operation, readily implemented with state-of-the-art primary detection devices, and relatively inexpensive to construct.

SUMMARY OF THE INVENTION

The foregoing object and other objects which will become apparent as the detailed description proceeds are achieved by an apparatus for testing the validity of a security or the like, comprising: a receptacle for receiving and mantaining the security in a test position; a source of illumination in juxtaposition to said receptacle for casting light upon the security; first reflection detection means in justaposition to said receptacle and opposite a first area on the security for sensing light reflected from said first area; second reflection detection means in juxtaposition to said receptacle and opposite a second area on the security for sensing light reflected by said second area; and circuit means interconnected between said first and second reflection detection means for comparing the intensities of light sensed by each of said means against that sensed by the other.

DESCRIPTION OF THE DRAWINGS

For a complete understanding of the objects, techniques and structure of the invention, reference should be had to the following detailed description and accompanying drawings wherein:

FIGS. 1*a* and 1*b*, is a highly illustrative view of first and second embodiments of the invention;

DETAILED DESCRIPTION OF PREFERRED EMBODIMENT

Figure 1:
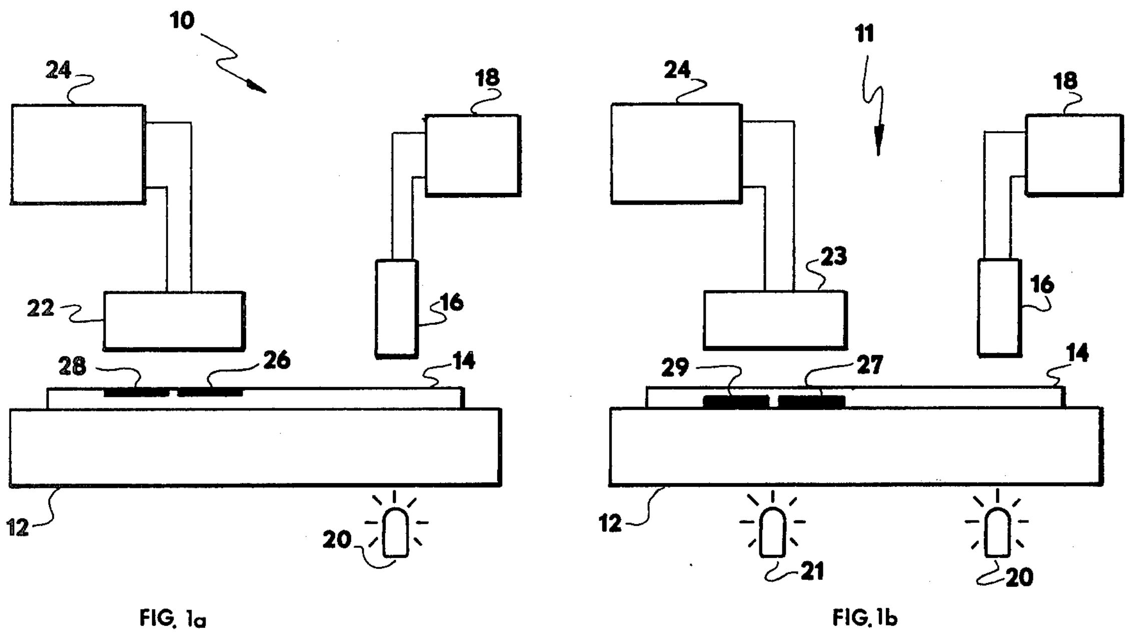
FIG. 1 comprising

Referring now to the drawings and more particularly FIG. 1*a*, it can be seen that a first embodiment of the invention is designated generally by the numeral 10. In standard fashion, a tray 12, slidable on guides, rollers or the like, is provided for receiving a note, currency or the like 14 thereon. A reticle 6 is provided in close juxtaposition to the note 14 and opposite a source of illumination such as the lamp 20. With the tray 12 being transparent, the lamp 20 illuminates a portion of the note 14 such that the reticle 16 may test a pattern thereon, the results of such tests being determined by appropriate validation circuitry 18. The elements 16–20 comprise what is standardly known in the art as a primary validation system.

With continued reference to FIG. 1*a*, it can be seen that a sensor 22, including light emitting and receiving means to be later discussed, is provided in close juxtaposition to the note 14 and in interconnection with secondary validation circuitry 24. The sensor 22 is positioned over the note 14 at a point whereat a light reflective area 26 is closely positioned to a light absorptive area 28. A single source of light is provided within the sensor 22 and directed upon the areas 26, 28. In a valid note, the area 26 will reflect a large portion of the light incident thereto, such reflected light being sensed by the sensor 22. Similarly, in a valid note, the light striking the area 28 will be absorbed or transmitted therethrough and only a small amount will be reflected back to the sensor 22. The circuit 24 is provided to test whether the ratio between the light reflected by area 26 and that reflected by area 28 is within a valid range and whether the absolute values of reflection are similarly valid. The particulars of such tests shall be brought out in more detail hereinafter.

With reference to FIG. 1*b*, it can be seen that an embodiment comprising a slight variation in the basic theme of the invention is designated generally by the numeral 11 and includes the basic elements 12–20 hereinbefore set forth with respect to FIG. 1*a*. In this instance, however, areas of different light transmissive characteristics (as to either infrared or visible) are selected as at 27, 29. An appropriate light source 21 is positioned opposite light sensors or detectors 23 with the areas 27, 29 interposed therebetween. Secondary validation circuitry 24 is interconnected with the sensors 23. With, for example, the area 27 being more transmissive to the light of the source 21 that the area 29 which is either reflective or absorptive with respect thereto, it has been found that a ratio of relative transmission values sensed by the associated sensors 23 exists, one sensor being associated with each area. As in the case above, the circuit 24 determines whether the ratio between the light transmitted through the area 27 and that transmitted through the area 29 is within a valid range and whether the absolute values of transmission are similarly valid. It will be appreciated by one skilled in the art that the circuits for each of the embodiments of FIG. 1*a* and FIG. 1*b* are substantially the same and hence discussion will be had hereinafter only with respect to that of FIG. 1*a*.

Figure 2:
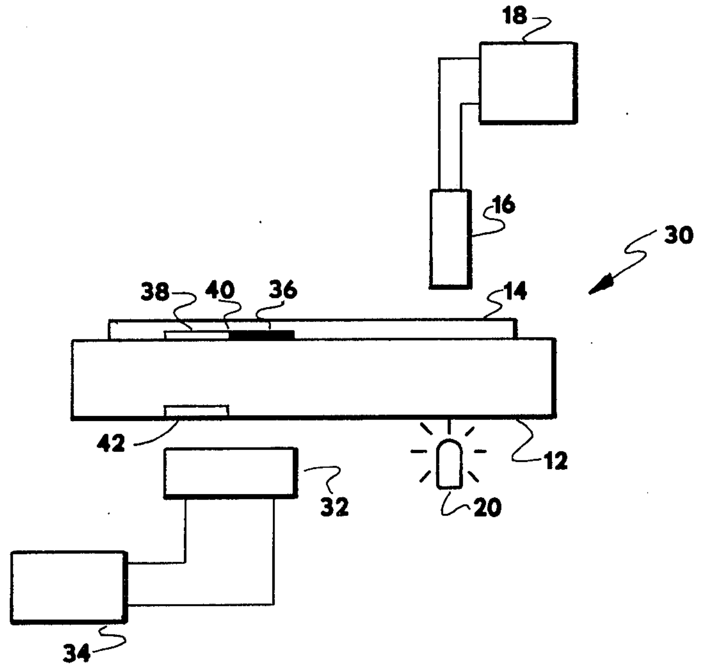
FIG. 2 is a highly illustrative view of a second embodiment of the invention.

With reference to FIG. 2, it can be seen that a second embodiment of the concept of the invention is presented and designated generally by the numeral 30. The elements 12–20 operate in an identical manner to that presented hereinabove with respect to FIG. 1. However, there is presented with this system a sensor 32 positioned beneath the tray 12 and note 14 for testing a side of the note opposite that upon which the primary test is conducted. Secondary validation circuitry 34 is interconnected to this sensor 32, which sensor is operative for testing light absorptive areas 36 and reflective areas 38 on the underside of the note 14 and separated by the boundary 40. In certain instances where a valid security is not characterized by the presence of these absorptive and reflective areas 36, 38, the tray 12 may be characterized by the presence of a light reflective area 42 interpositioned for purposes of providing a light reflective reference against which the absorptive area 36 may be compared against each other (preferably on the underside of the instrument 14) to secondarily test validity in conjunction with the elements 16–20.

Figure 3:
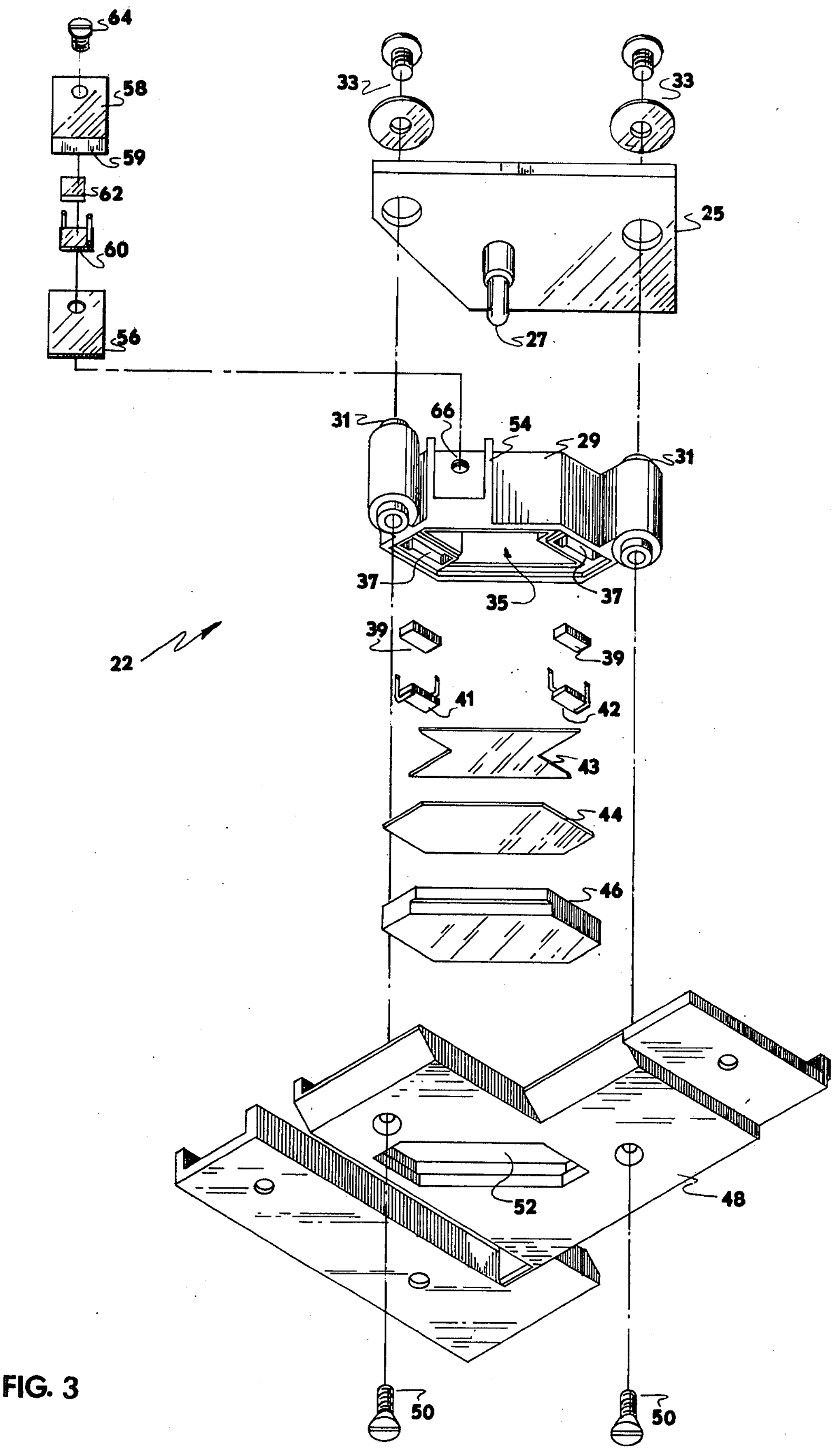
FIG. 3 is an assembly drawing of an embodiment of the invention as utilized with the apparatus of FIG. 1.

The sensor 22 is illustratively shown in FIG. 1*a* is presented with greater specificity in FIG. 3 as including a top plate or cover 25 which, in the preferred embodiment, also comprises a printed circuit board to which appropriate electrical connections may be made for interconnection with the circuitry 24. Depending from the plate 25, is an appropriate lamp 27 which may be a standard tungsten lamp or a light-emitting diode (LED) depending upon the particular application of the system. A casing 29 having threaded tubular receptacles 31 at each end thereof is capped by the plate 25 via the screw and washer assemblies 33, these screws being received within the receptacles 31. With the plate 25 appropriately affixed to the casing 29, the lamp 27 is maintained within a light chamber 35.

Adjacent to but isolated from the light chamber 35 are sensor housings 37 into which there is preferably placed a securing foam tape 39 for securing and maintaining respective silicon photo cells 41, 42. Received over the light chamber 35 is a light diffuser 43 which functions in the standard manner. Depending upon the portion of the light spectrum in which the system is to operate and the particular characteristics of the lamp 27, an appropriate filter 44 is next provided to cover the light chamber and/or the photo cells 41, 42. Next a highly transparent lens assembly 46 is positioned over the entire lower section of the casing 29 and maintained by a bottom clip plate or cover 48 which is in turn secured by means of screws 50 to the receptacles 31. A window 52 is provided within the plate 48 for the lens 46.

Provided on a side of the casing 29 is a bracket 54 which may receive an appropriate filter 56 therein and maintain the same adjacent to the casing 29. The filter 56 is preferably of like nature to the filter 44 discussed hereinabove. If no such filter is necessary, as determined by the operative range of the light spectrum, a transparent spacer may be used. A reference cell holder 58 is also received within the bracket 54 and has a lid 59 protruding from a bottom portion thereof upon which a referenced silicon cell 60 is supported. Mounting tape 62 is further provided for maintaining the photo cell 60 is proper between the filter 56 and the holder 58. Appropriate screws 64 secure the elements 56–62 within the bracket 54 by means of engagement with the screw hole 66.

Figure 4:
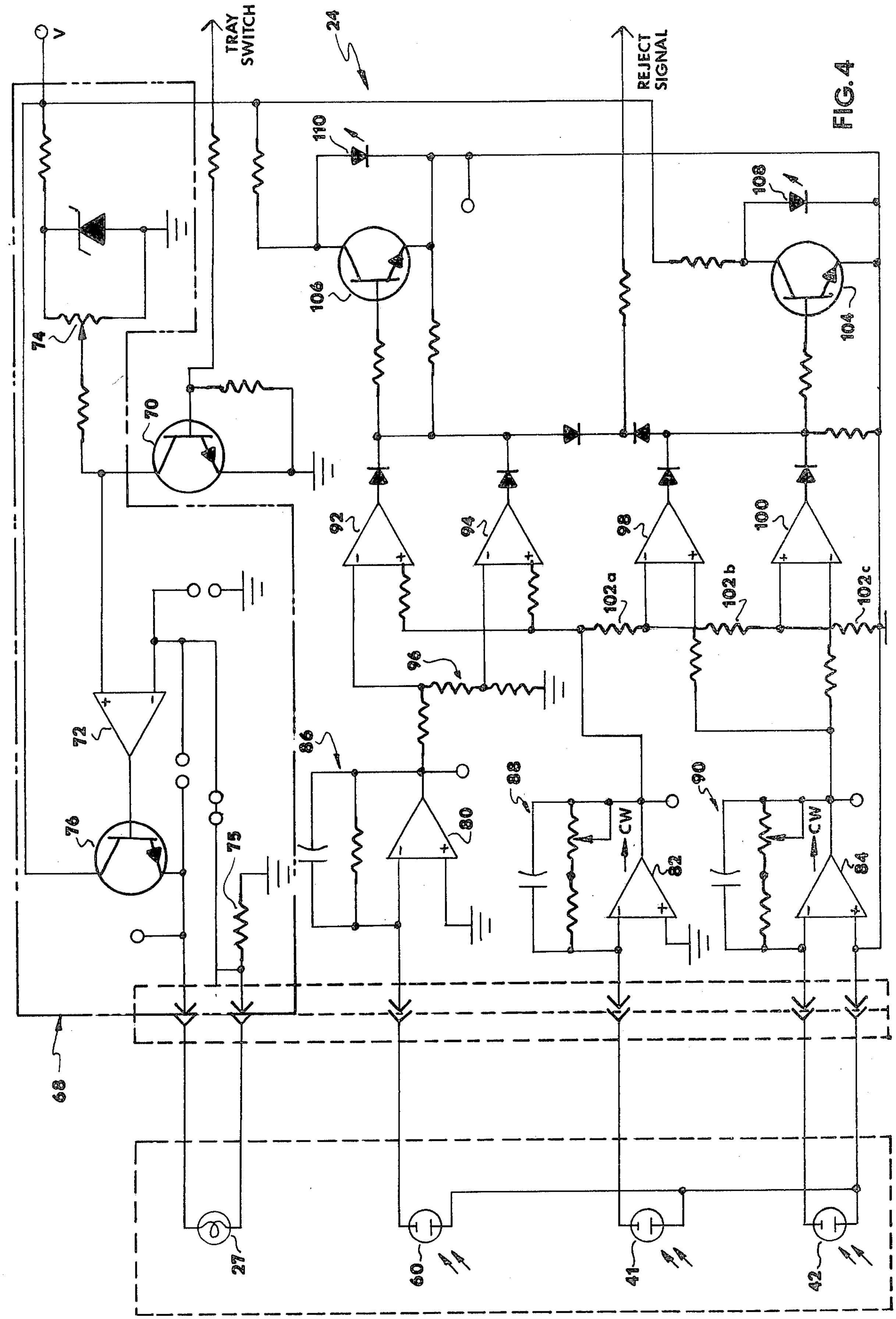
FIG. 4 is a schematic diagram of the circuitry of the invention utilized in conjunction with the mechanical structure of FIG. 3.

The circuitry 24 utilized in conjunction with the operation of the structures of FIG. 1 and 3 is schematically set forth in FIG. 4. There is provided in this circuitry a lamp excitation circuit 68 which is activated by the closing of the tray 14 in a standard fashion to trip a tray switch (not shown). Upon actuation of the tray switch, the transistor 70 turns off allowing a positive voltage, defined by potentiometer 74, to be applied to the positive input of the operational amplifier 72. This voltage defines a current through resistor 75 with the same current flowing through the lamp 27. In short, the circuit 68 presents constant current driver for the lamp 27. Consequently, the lamp 27 is illuminated only upon closing of the tray 12 with the resultant placement of the note 14 is the test position.

Operational amplifiers 80, 82, 84 are provided and have associated therewith respective feedback circuitry 86, 88, 90 for purposes of achievement of proper gain. As can be seen, the feedback circuits 88, 90 include variable resistors for adjustment and tuning of the gain. As discussed with reference to FIG. 3, the reference photo cell 60 is maintained adjacent to the casing 29 which may either have a small hole therein for transmitting light from the light chamber 35 upon the cell 60 or may be constructed of a partially translucent material such as propianate such that in any event illumination of the lamp 27 will cause light to impinge upon the reference cell 60. With the lamp 27 maintained within the chamber 35 and with the walls of the chamber being of a highly reflective material such as propianate, it should be appreciated that the actual position of the lamp 27 or the filament thereof is not critical but that light therefrom will impinge upon the reference cell 60 and, in standard fashion, the operational amplifier 80 will present an output signal corresponding to the light intensity incident to the cell 60.

It should now be further appreciated that with the lamp 27 illuminated, the light passing through the window 52 of the bottom casing 48 will be caused to impinge upon the note 14 as shown in FIG. 1. The areas 26, 28 will reflect portions of the light incident thereto back to the photocells 41, 42 respectively. There will consequently be an output from the amplifier 82 proportional to the light reflected from the area 26 (such area being of a highly reflective nature) and there will be an output from the amplifier 84 proportional to the light reflected from the area 28 (such area being of a light absorptive nature).

Receiving the output of the reference amplifier 80 are operational amplifiers 92, 94 connected as comparators. A threshold circuit or voltage divider 96 is provided such that different percentages of the output of the amplifier 80 are applied to each of the comparators with the amplifier 92 receiving a first larger signal and the amplifier 94 receiving a second smaller signal. Also applied to the comparators 92, 94 is the output of the high reflectance amplifier 82. It should be readily apparent to those skilled in the art that if the output of the amplifier 82 is above a first larger percentage of the output of the amplifier 80, then an output signal will be evidenced from the comparator 92. Similarly, if the output of the high reflectance amplifier 82 is less than a second smaller percentage of the output of the amplifier 80, as determined by voltage divider 96, an output will be evidenced from the comparator 94. Consequently, an output signal will be presented from the comparators 92, 94 is the light level sensed by the high reflectance sensing cell 41 is above a first percentage of the light sensed by the reference cell 60 or below a second percentage of the light sensed by the reference cell 60.

The relative relationships between output of the high reflectance cell 41 and low reflectance cell 42 is determined via operational amplifiers 98, 100 which are connected to operate as comparators. The output of the low reflectance amplifier 84 is applied to inputs of the amplifiers 98, 100. A first larger percentage of the output of the high reflectance amplifier 82 is applied to an input of the comparator 100. The particular percentages applied are determined by the threshold circuit or voltage divider comprising resistors **102*a*, 102*b*, and 102*c*. It should be readily apparent to those skilled in the art that if the output of the low reflectance amplifier 84 is greater than the first larger percentage of the output of the amplifier 82 as determined by the comparator 98, then an error output signal will be evidenced and the same will occur if the output of the low reflectance amplifier 84 is less than the second smaller percentage of the output of the amplifier 82 as determined by the comparator 100. Consequently, a valid document will result in the amount of reflected light received by the sensing cell 42 beng less than a first percentage of the reflected light sensed by the cell 41** and greater than a second percentage of the light sensed thereby.

An output from any of the amplifiers 92, 94, 98, or 100 will result in a reject signal through the appropriate diodes as shown. Further, a failure of the sensing cells 41, 42 to sensor the proper amounts of reflected light with respect to each other, will result in an output of invalidity signal from either the comparator 98 or 100 in which case the transistor 104 will be gated on and the LED 108 will be off indicating that the relative reflectance portion of the test has been failed. Similarly, if the test relating the light sensed by the high reflectance cell 41 to the reference cell 60 has failed, then an output from either the comparator 92 or 94 will result in a gating on of the transistor 106 and nonillumination of the LED 110 indicating that the high reflectance cell 41 has not sensed appropriate reflected light to fall within the bandwidth established by voltage divider 96. It all tests are passed, then no reject signal is present and, if the primary validity test has been passed, an acceptance signal will be created by appropriate circuitry within the associated validation apparatus.

Figure 5:
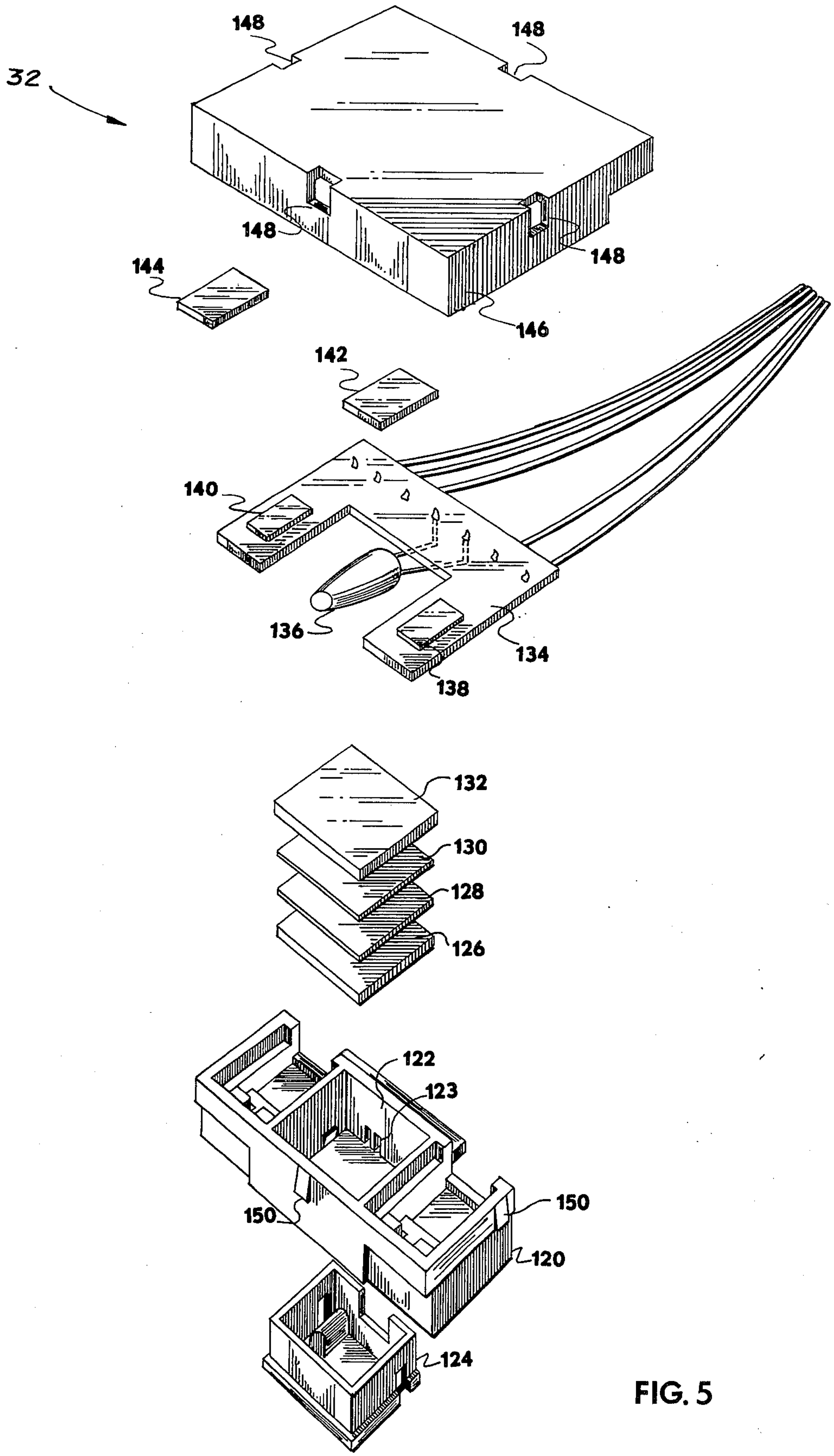
FIG. 5 is an assembly drawing of an embodiment of the invention as utilized with the apparatus of FIG. 2.

With reference now to FIG. 5, a second embodiment of a secondary detection system according to the teachings of the instant invention may be seen as designated generally by the numeral 32. This sensor is of the nature illustratively depicted in FIG. 2 discussed in brevity above. As can be seen, the sensor 32 includes a casing 120 having a cavity 122 centrally located therein. An insert 124 a adaptable for receipt in the cavity 122 and is preferably of a highly light reflective nature and constructed of a material such as propianate. Provided atop the cavity 122 are appropriate elements such as a diffuser 126, filter 128, 130, and lens 132. A cover plate which may also be a printed circuit board 134 is provided for capping the casing 120. Connected to the printed circuit board 134 is a lamp 136 which is maintained within the light reflective insert 124 by passage of the leads thereof through the slots 123. Photocells 138, 140 are provided on the printed circuit board 134 at each end thereof and in alignment with the assembly of elements 126–132. Depending upon the utilization of the device disclosed, filters 142, 144 may be provided over the cells 138, 140. The elements heretofore described are maintained in proper position by means of a transparent snap cover 146 having slots 148 positioned thereabove for engagement with the snaps 150. It should be readily apparent that the composite just described has a source of illumination 136 casting light upward (or downward) through the elements 126–132 and onto surfaces of the paper to be validated. Light reflected from such paper is sensed by the photocells 138, 140. Of course, as mentioned hereinabove with respect to FIG. 2, if the instrument being validated does not have appropriate reflective surfaces thereon, a reflective insert 42 may be provided in the tray 12 to provide a reference reflective surface.

With continued reference to the structure of FIG. 5 and that discussed hereinabove with respect to FIG. 3, it should be appreciated that the concept of the invention is intended to cover a full spectrum of light wave lengths from infrared to ultraviolet and all the visible wave lengths therebetween. Depending upon the particular type of illumination source or lamp utilized and the character of the note being tested, appropriate filters must occasionally be utilized to achieve the desired result. For instance, the sensing or comparison technique may test adjacent areas of similar color density but of different color and thus require illumination by a light source in the visible range with a filtering out of infrared light. It is believed to be well within the capabilities of one skilled in the art to appropriately select the proper light source and filtering elements for achieving the tests set forth herein.

Figure 6:
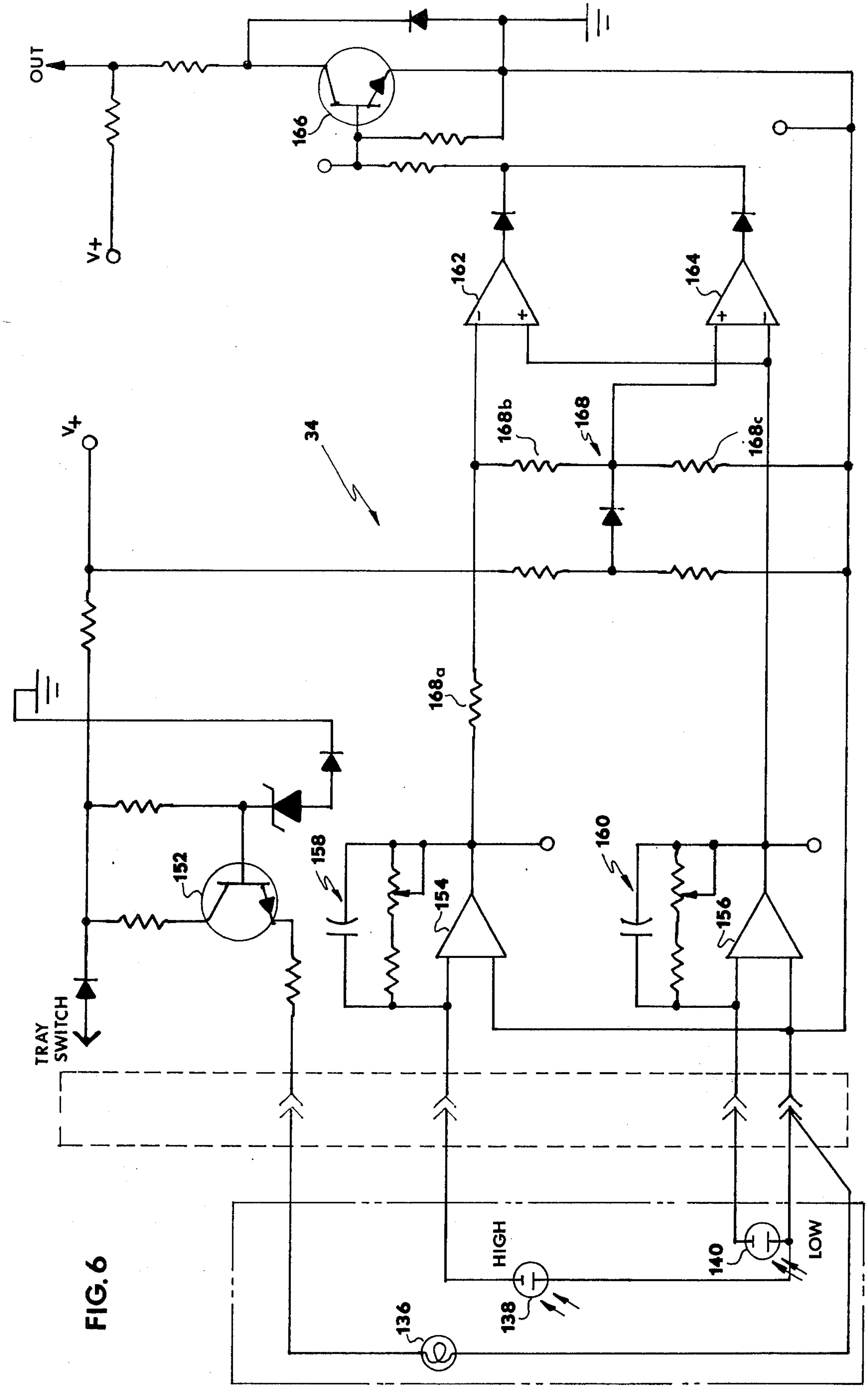
FIG. 6 is a schematic diagram of the circuitry of the invention utilized with the mechanical structure of FIG. 5.

With reference now to FIG. 6, it can be seen that the circuitry necessary for operation and utilization of the structure of FIG. 5 is shown and designated generally by the numeral 34. In this circuit a transistor 152 is gated into conduction by means of the tray switch with such actuation illuminating the lamp 136. A high reflectance sensor 138 is provided as is a low reflectance sensing cell 140; each of these being connected to the respective operational amplifiers 154, 156 and having is own adjustable feedback circuit 158, 160 for gain selection. The output of the amplifier 154 is proportional to the reflected light sensed by the high reflectance cell 138 while the output of the amplifier 156 is proportional to the light sensed by the low reflectance cell 140. The output of the amplifier 156 is applied to the inputs of both amplifiers 162, 164 which are connected as comparators. A first percentage of the output of the amplifier 154 is applied to the comparator 162 while a second lower percentage of the signal is applied to the comparator 164. A threshold circuit or voltage divider 168 is again provided for purposes of determining the exact percentage of the signal from the amplifier 154 which is applied to the comparators 162, 164. As discussed hereinabove with respect to FIG. 4, the comparator 162 compares the output of the low reflectance amplifier 156 against a first high percentage of the output of the high reflectance amplifier 154 while the comparator 164 compares a second lower percentage of the output of the amplifier 154 against the output of the low reflectance amplifier 156. An output from either of the amplifiers or comparators 162, 164 is sufficient to gate the transistor 166 into conduction and produce an appropriate output error signal.

It should be appreciated with respect to the circuitry of FIG. 6 that relative tests are made with respect to the light reflectance levels sensed by the cells 138, 140 with no absolute reference level being incorporated. If the amount of light sensed by the low reflectance cell 140 falls between first and second percentages of the light sensed by the high reflectance cell 138, then the secondary test is passed and no output error signal is produced and the remainder of the validation system may make the determination that the security is valid.

Thus it can be seen that the objects of the invention have been achieved by presenting apparatus which senses relative levels of reflectance of emitted light and capitalizes upon the reflectance characteristics of the security itself by sensing areas having color differences or areas wherein the inks are of different infrared reflective natures. The systems presented hereinabove take advantage of characteristics of most currencies of securities that light reflective and absorptive areas are present on the same side of the bill and that by appropriately structuring the geometry of the sensor housings to place a sensor in juxtaposition to each of at least two of such areas, tests may be made on these areas which are only passed by a valid security and cannot be passed by a facsimile.

While in accordance with the patent statutes only the best mode and preferred embodiments of the invention have been presented and described in detail, it is to be understood that the invention is not limited thereto or thereby. Consequently, for an appreciation of the true scope and breadth of the invention, reference should be had to the following claims.

What is claimed is:

1. A device for testing the validity of an instument such as a security, note currency, or the like, comprising:

a tray slidable upon a track for receiving such instrument and positioning the same in a test position;

a light source maintained within a housing in juxtaposition to said tray;

first and second photo cells maintained within said housing and respectively opposite first and second areas of the instrument for sensing light reflected from said associated areas; and first and second comparator circuits interconnected between said first and second photocells and receiving output signals therefrom, said comparator circuits producing an output signal if the reflected light sensed by said first photo cell is greater than a first percentage or less than a second percentage of the reflected light sensed by said second photo cell and wherein said tray is substantially transparent with a portion thereof being highly light reflective, said portion being interposed in juxtaposition to said second photo cell.

2. The device as recited in claim 1 wherein said first and second photo cells are maintained on opposite sides of said light source.

3. The device as recited in claim 2 wherein said first and second photo cells and said light source are covered by a light filter.

4. The device as recited in claim 1 which further includes a third photo cell positioned adjacent and receiving light from said light source and third and fourth comparator circuits interconnected between said second and third photo cells, said third and fourth comparator circuits producing an output signal when the reflected light intensity sensed by the second photo cell is above a first percentage or below a second percentage of the light intensity sensed by said third photo cell.

5. The device as recited in claim 1 wherein said light source is illuminated by sliding of the tray upon said track to place the instrument in said test position.

6. The device as recited in claim 1 wherein said housing is constructed of a highly light reflective and partially light transmissive material.

7. Apparatus for testing the validity of a security or the like, comprising:

a receptacle for receiving and maintaining the security in a test position;

a source of illumination maintained within a housing having a single window in juxtaposition to said receptacle for casting light upon the security;

a first photodetector in juxtaposition to said receptacle and opposite a first area on the security for sensing light reflected from said first area;

a second photodetector in juxtaposition to said receptacle and opposite a second area on the security for sensing light reflected by said second area said first and second areas receiving light from said source of illumination through said window;

a third photodetector adjacent to and sensing the light actually emitted by said source to illumination; and circuit means interconnected between said first, second, and third photodetectors for comparing the intensities of light sensed by each of said photodetectors and producing an output signal when the light reflected from said second area is greater than a first percentage or less than a second percentage of that reflected by said first area and when the light reflected by one of said first or second areas is not within a predetermined range of the light emitted from said source of illumination.

8. The apparatus according to claim 7 wherein said source of illumination, and said first, second, and third photodetectors are maintained within said housing, said source of illumination and said first and second photodetectors being exposed to said security through a common planar surface including said window, and wherein said housing is constructed of a highly reflective and partially light transmissive material.

* * * * *

UNITED STATES PATENT OFFICE
CERTIFICATE OF CORRECTION

PATENT NO. : 4,127,328
DATED : November 28, 1978
INVENTOR(S) : Robert L. Gorgone, et al It is certified that error appears in the above-identified patent and that said Letters Patent are hereby corrected as shown below:

Page 1, the first several lines, including the title, have been omitted. Please correct to read --ABSTRACT OF THE DISCLOSURE-- (title); next lines to read: --Apparatus for conducting secondary tests for security validation are presented. In one embodiment of the--.

Same page, last line, correct to read: --housing preferably constructed of a highly light reflective material.--

Signed and Sealed this

*First* Day of *May 1979*

[SEAL]

*Attest:*

RUTH C. MASON
*Attesting Officer*

DONALD W. BANNER
*Commissioner of Patents and Trademarks*